(12) United States Patent
Cheng et al.

(10) Patent No.: US 7,929,995 B2
(45) Date of Patent: Apr. 19, 2011

(54) SYSTEM AND METHOD TO TRANSMIT/RECEIVE SIGNAL IN A MOBILE COMMUNICATION SYSTEM

(75) Inventors: Shan Cheng, Suwon-si (KR); Eun-Taek Lim, Suwon-si (KR); Young-Bin Chang, Anyang-si (KR); Chang-Yoon Oh, Yongin-si (KR); Dong-Seek Park, Yongin-si (KR); Pan-Yuh Joo, Seoul (KR); Joon-Young Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 806 days.

(21) Appl. No.: 11/862,619

(22) Filed: Sep. 27, 2007

(65) Prior Publication Data

US 2008/0076433 A1 Mar. 27, 2008

(30) Foreign Application Priority Data

Sep. 27, 2006 (KR) .................. 10-2006-0094179

(51) Int. Cl.
*H04M 1/00* (2006.01)
(52) U.S. Cl. .................. 455/562.1; 455/11.1; 455/13.1; 455/13.3; 455/25; 455/101; 455/435.1; 455/435.2; 455/450; 455/525; 370/310; 370/310.2; 370/315; 370/319; 370/320; 370/321; 370/329; 370/334
(58) Field of Classification Search .............. 455/435.1, 455/435.2, 436, 450, 11.1, 13.1, 13.3, 25, 455/524, 101, 562.1; 370/310 M, 310.2, 315, 319–321, 329, 334, 310
See application file for complete search history.

(56) References Cited

U.S. PATENT DOCUMENTS

| | | | |
|---|---|---|---|
| 6,459,881 B1* | 10/2002 | Hoder et al. | 455/11.1 |
| 7,319,714 B2* | 1/2008 | Sakata et al. | 375/211 |
| 7,403,508 B1* | 7/2008 | Miao | 370/335 |
| 7,463,673 B2* | 12/2008 | Fujii et al. | 375/211 |
| 7,483,718 B2* | 1/2009 | Catreux-Erceg et al. | 455/562.1 |
| 7,508,798 B2* | 3/2009 | Tong et al. | 370/337 |
| 2002/0173302 A1* | 11/2002 | Baker et al. | 455/422 |
| 2004/0192204 A1* | 9/2004 | Periyalwar et al. | 455/25 |
| 2006/0105709 A1 | 5/2006 | Oh et al. | |
| 2006/0268769 A1* | 11/2006 | Pan et al. | 370/328 |
| 2006/0291582 A1* | 12/2006 | Walton et al. | 375/267 |
| 2007/0002892 A1* | 1/2007 | Waxman | 370/465 |

FOREIGN PATENT DOCUMENTS

| | | | |
|---|---|---|---|
| KR | 10-2005-0120972 A | 12/2005 | |
| KR | 10-2006-0029001 A | 4/2006 | |
| KR | 10-2006-0035358 A | 4/2006 | |
| KR | 10-2006-0041978 A | 5/2006 | |

\* cited by examiner

*Primary Examiner* — Stephen M D'Agosta
(74) *Attorney, Agent, or Firm* — Jefferson IP Law, LLP

(57) ABSTRACT

In a mobile communication system, a relay station (RS) is used for signal exchange with a base station (BS), and includes a first antenna set including at least one antenna, used for signal exchange with the BS, and a second antenna set including at least one antenna, used for signal exchange with a mobile station (MS). The RS selects at least one antenna from the second antenna set for each of the at least one MS, and exchanges a signal with the MS using the selected at least one antenna.

20 Claims, 3 Drawing Sheets

SYSTEM AND METHOD TO TRANSMIT/RECEIVE SIGNAL IN A MOBILE COMMUNICATION SYSTEM

PRIORITY

This application claims the benefit under 35 U.S.C. §119 (a) of a Korean patent application filed on Sep. 27, 2006 in the Korean Intellectual Property Office and assigned Serial No. 2006-94179, the entire disclosure of which is hereby incorporated by reference.

BACKGROUND OF THE INVENTION

1. Field of the Invention

The present invention relates generally to a signal transmission/reception system and method in a mobile communication system. More particularly, the present invention relates to a system and method to transmit/receive signals in a Time-Division Duplex (TDD) mobile communication system using multi-hop scheme (hereinafter referred to as a "multi-hop TDD mobile communication system").

2. Description of the Related Art

Intensive research in a next generation communication system is being conducted to provide Mobile Stations (MSs) with high-speed services having various high Quality-of-Service (QoS) classes. Multi-hop scheme is a conventional transmission/reception scheme, the use of which is positively considered as a next generation communication system. With reference to FIG. 1, a description will now be made of a configuration of a multi-hop TDD mobile communication system.

FIG. 1 is a diagram illustrating a configuration of a general multi-hop TDD mobile communication system.

Referring to FIG. 1, the multi-hop TDD mobile communication system includes an Internet backbone 111, a mobile communication network 113, multiple Base Stations (BSs) of BS#1 115-1 and BS#2 115-2, multiple Relay Stations (RSs) of RS#1 117-1 and RS#2 117-2, and multiple MSs of MS#1 119-1, MS#2 119-2, MS#3 119-3 and MS#4 119-4.

The RSs 117-1 and 117-2 are installed for throughput enhancement or service coverage extension. The internet backbone 111 is connected to the mobile communication network 113, and the mobile communication network 113 performs communication with the BSs 115-1 and 115-2. The BS#1 115-1 performs communication with the RSs 117-1 and 117-2. The BS#1 115-1 is a parent BS for the RSs 117-1 and 117-2, and the RSs 117-1 and 117-2 are children RSs of the BS#1 115-1.

The RS#1 117-1 performs communication with the MSs 119-1, 119-2 and 119-3. The RS#1 117-1 is a parent RS of the MSs 119-1, 119-2 and 119-3, and the MSs 119-1, 119-2 and 119-3 are children MSs of the RS#1 117-1. The MS#4 119-4 performs direct communication with a BS, i.e. BS#1 115-1, without any RS. A MS that performs direct communication with a BS without any RS in this way will referred to as a 'legacy MS'. Therefore, the MS#4 119-4 is a legacy MS of the BS#1 115-1.

For a downlink (DL) interval, the RSs 117-1 and 117-2 receive the signals that the BS#1 115-1 has transmitted to the targets of the MSs 119-1, 119-2 and 119-3, and retransmit the received signals to the MSs 119-1, 119-2 and 119-3 over an RS-MS link having a channel quality higher than the channel quality between the BS#1 115-1 and the MSs 119-1, 119-2 and 119-3.

For an uplink interval, the RSs 117-1 and 117-2 receive the signals transmitted from the MSs 119-1, 119-2 and 119-3, and retransmit the received signals to the BS#1 115-1. The signal retransmission operation performed for the downlink interval and uplink interval can be performed according to an Amplify-and-Forward (AF) mode, or can be performed according to a Decode-and-Forward (DF) mode. A description of the AF mode and DF mode will be made below.

In the AF mode, an RS simply amplifies a received signal and then forwards it to its corresponding children MSs. Therefore, in the AF mode, the amplified signal, whose additive white noise is also amplified, is retransmitted from the RS to the MSs.

In the DF mode, an RS decodes a signal received from a BS, performs re-encoding and re-scheduling on the decoded signal where applicable, and then retransmits it to corresponding MSs. As a result, the AF mode results in a relatively simple RS structure, while the DF mode is preferable in terms of the reliability and efficiency of the relay transmission.

Generally, the multi-hop TDD mobile communication system operates in a half-duplex mode. In the half-duplex mode, the multi-hop TDD mobile communication system transmits a downlink signal and an uplink signal in sequence. It will be assumed herein that a basic transmission unit of the downlink signal is a downlink frame, and a basic transmission unit of the uplink signal is an uplink frame.

First, a description will be made of an operation of transmitting the downlink frame.

In a first step, for a time that an RS transmits no downlink frame, a BS transmits a downlink frame to a child RS and a legacy MS. In a second step, the RS transmits a downlink frame, which contains information for those children MSs of the said RS and received from the said first downlink frame transmitted by the said BS in the first step, to its children MS.

Second, a description will be made of an operation of transmitting the uplink frame.

In a first step, for a time that an RS transmits no uplink frame, a child MS transmits an uplink frame to the RS, and a legacy MS transmits an uplink frame to a BS. In a second step, the RS transmits a uplink frame, which contains information received from its children MS during the said uplink frame transmitted by the said children MSs in the first step, to the RS's parent BS.

As described above, the half-duplex mode is an operation mode based on the assumption that the RS cannot simultaneously perform a signal transmission operation and a signal reception operation. In addition, the half-duplex mode is an operation mode based not only on a near-field effect of antennas, but also on compatibility with a frequency reuse factor=1.

When the multi-hop TDD mobile communication system operates in the half-duplex mode, interference occurrence between a BS and an RS is prevented in a downlink frame interval, and interference occurrence between an RS and an MS is prevented in an uplink frame interval. However, when the multi-hop TDD mobile communication system uses the half-duplex mode, a data rate becomes ½, causing a limitation in the data rate.

The wireless channel environment of the mobile communication system, unlike a wired channel environment, may suffer from an information loss caused by inevitable errors due to various factors such as multi-path interference, shadowing, propagation loss, time-varying noise, interference, fading, etc. The information loss causes considerable distortion to an actual transmission signal, reducing the entire performance of the mobile communication system.

Therefore, the next generation communication system positively considers using a diversity scheme to avoid instability of communication due to the fading. The diversity scheme can be roughly classified into a time diversity scheme, frequency diversity scheme and an antenna diversity scheme, or space diversity scheme.

The antenna diversity scheme, a multiple antenna technique, can be classified into a reception antenna diversity scheme using multiple reception antennas, a transmission antenna diversity scheme using multiple transmission antennas, and a Multiple Input Multiple Output (MIMO) scheme using multiple reception antennas and multiple transmission antennas. The MIMO scheme is a kind of a Space-Time Coding (STC) scheme, and the STC scheme transmits signals encoded by a predetermined coding scheme, using multiple transmission antennas, thereby extending a time-domain coding scheme to a space-domain coding scheme, and thus achieving a lower error rate.

As described above, the use of the MIMO scheme may reduce the information loss, thus facilitating efficient high-speed, high-capacity data transmission. However, the current multi-hop TDD mobile communication system has provided no detailed scheme for the use of the MIMO scheme.

SUMMARY OF THE INVENTION

An aspect of the present invention is to address at least the above problems and/or disadvantages and to provide at least the advantages described below. Accordingly, an aspect of the present invention is to provide a system and method for transmitting/receiving signals in a multi-hop TDD mobile communication system.

Another aspect of the present invention is to provide a system and method to transmit/receive signals in a full duplex mode in a multi-hop TDD mobile communication system.

Another aspect of the present invention is to provide a system and method to transmit/receive signals to acquire a MIMO diversity gain in a multi-hop TDD mobile communication system.

According to one aspect of the present invention, a system to transmit/receive a signal in a mobile communication system is provided. The signal transmission/reception system includes a base station (BS), at least one mobile station (MS), a relay station (RS) that includes a first antenna set including at least one antenna, used for signal exchange with the BS, and a second antenna set including at least one antenna, used for signal exchange with the MS, wherein the RS selects at least one antenna from the second antenna set for each of the at least one MS, and exchanges a signal with the MS using the selected at least one antenna.

According to another aspect of the present invention, a method to transmit/receive a signal in a relay station (RS) of a mobile communication system is provided. In the signal transmission/reception method, when the RS includes a first antenna set including at least one antenna, used for signal exchange with a base station (BS), and a second antenna set including at least one antenna, used for signal exchange with a mobile station (MS), selecting at least one antenna for each MS from the second antenna set to maximize communication capacity with the said MS, and exchanging a signal with the said MS using the selected at least one antenna.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of known functions and configurations will be omitted for clarity and conciseness.

An exemplary embodiment of the present invention provides a system and method to transmit/receive signals in a full duplex mode to acquire a Multi-Input-Multi-Output (MIMO) diversity gain in a mobile communication system. A description of an exemplary embodiment of the present invention will be made herein with reference to a Time-Division Duplex (TDD) mobile communication system using multi-hop scheme (hereinafter referred to as a "multi-hop TDD mobile communication system"). The multi-hop TDD mobile communication system can use multiple carriers or a single carrier. For convenience, the multi-hop TDD mobile communication system will be assumed herein to use multiple carriers.

Figure 1:
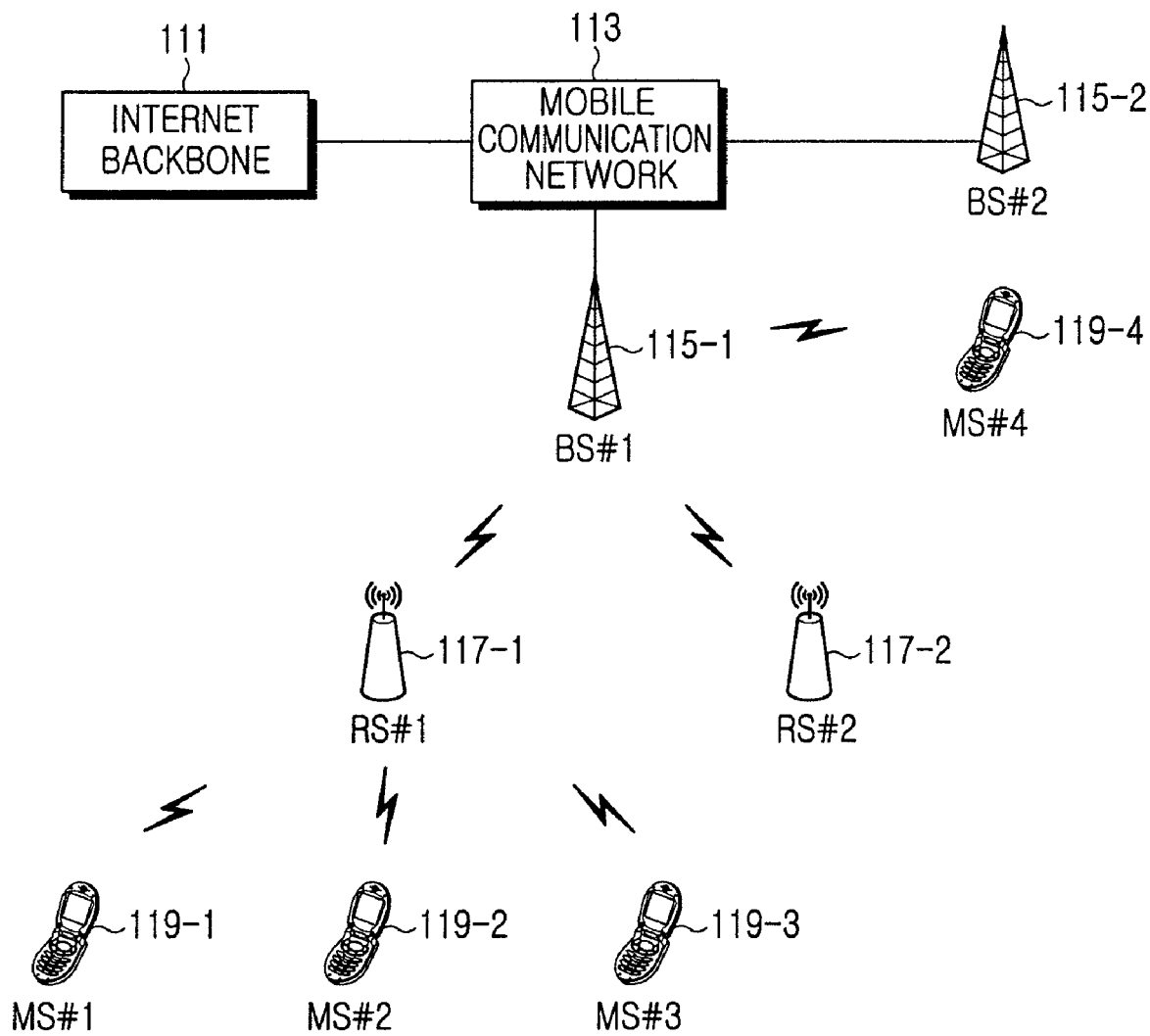
FIG. 1 is a diagram illustrating a configuration of a general multi-hop TDD mobile communication system.
Figure 2:
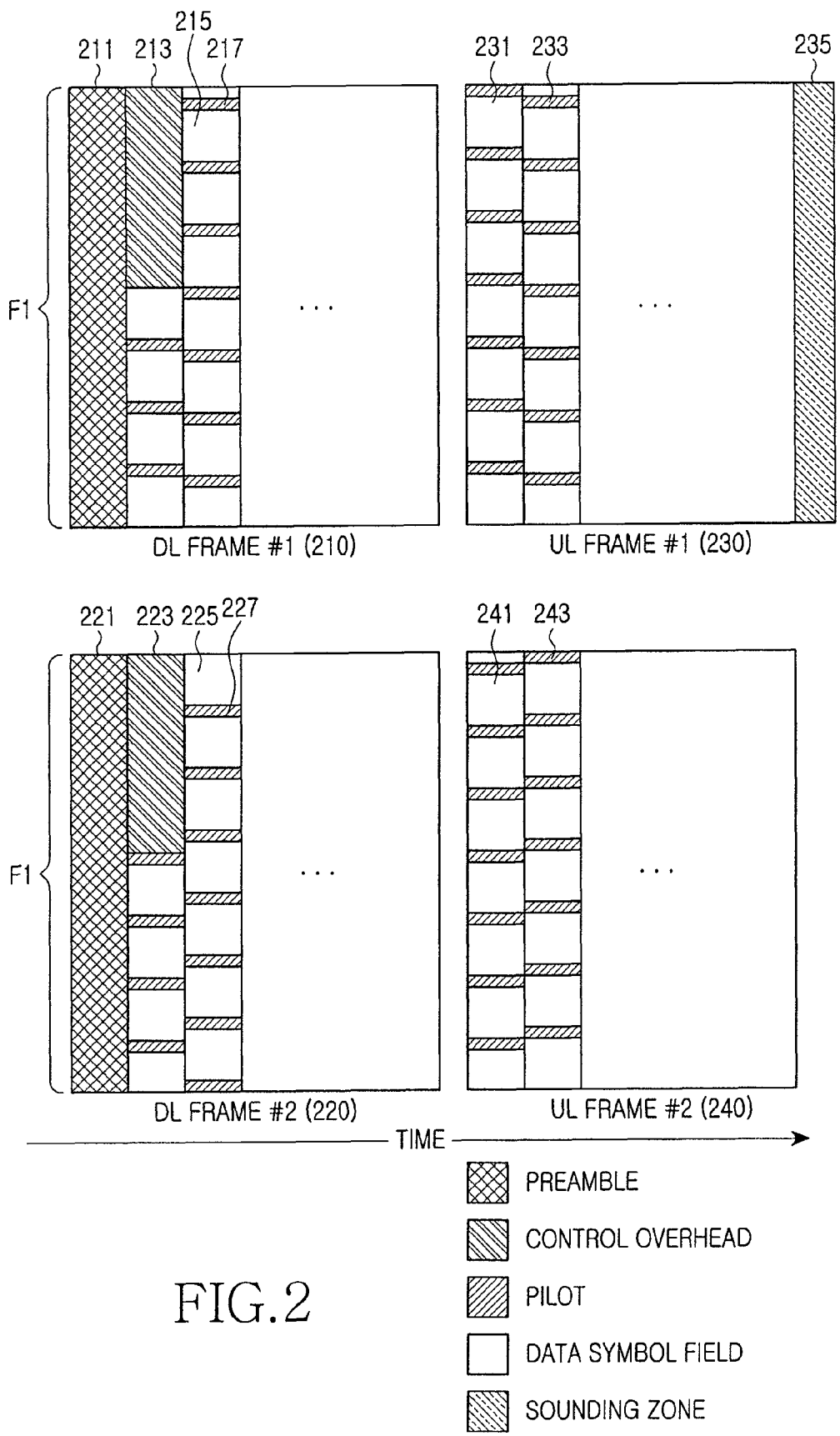
FIG. 2 is a diagram illustrating a frame structure for a multi-hop TDD mobile communication system according to an exemplary embodiment of the present invention.

FIG. 2 is a diagram illustrating a frame structure for a multi-hop TDD mobile communication system according to an exemplary embodiment of the present invention.

The frame structure shown in FIG. 2 is given on the assumption that a Base Station (BS), a Relay Station (RS) and a Mobile Station (MS) use the same frequency band F1 in a frequency domain. As illustrated in FIG. 2, the frame structure for the multi-hop TDD mobile communication system may include a downlink (DL) frame and an uplink (UL) frame. The downlink frame includes a downlink frame #1 210 and a downlink frame #2 220, and the uplink frame includes an uplink frame #1 230 and an uplink frame #2 240. A description will now be made of the downlink frame #1 210, the downlink frame #2 220, the uplink frame #1 230 and the uplink frame #2 240.

First, the downlink frame #1 210 will be described.

The downlink frame #1 210 is a frame that a BS transmits to a child RS and a legacy MS. The legacy MS as used herein refers to an MS that performs direct communication with the BS without going through any RS.

The downlink frame #1 210 at least includes a BS preamble field 211, a control overhead field 213, a data symbol field 215, and a pilot symbol field 217. The BS preamble field 211 is a field over which a preamble signal of a corresponding BS is transmitted. The control overhead field 213 is a field used for transmitting a bitmap for channelization and scheduling of the downlink frame #1 210, and a bitmap for channelization and scheduling for legacy MSs on the uplink frame #1 230 and the uplink frame #2 240.

The data symbol field 215 is a field over which traffic data targeting a child RS and/or a legacy MS is transmitted. The pilot symbol field 217 is a field over which a pilot signal for channel estimation at a receiving entity is transmitted.

Second, the downlink frame #2 220 will be described.

The downlink frame #2 220 is a frame that an RS transmits to a child MS. The downlink frame #2 220 at least includes an RS preamble field 221, a control overhead field 223, a data symbol field 225, and a pilot symbol field 227. The RS preamble field 221 is a field over which a preamble signal of a corresponding RS is transmitted. The control overhead field 223 is a field over which a bitmap for channelization and scheduling of the downlink frame #2 220 is transmitted.

The data symbol field 225 is a field over which traffic data targeting a child MS at an RS is transmitted. The pilot symbol field 227 is a field over which a pilot signal for channel estimation at a receiving entity is transmitted.

Third, the uplink frame #1 230 will be described.

The uplink frame #1 230 is a frame that an MS transmits to a parent RS or a parent BS. The uplink frame #1 230 at least includes a data symbol field 231, a pilot symbol field 233, and a sounding zone 235. The data symbol field 231 is a field over which traffic data targeting the parent RS or parent BS is transmitted.

The pilot symbol field 233 is a field over which a pilot signal for channel estimation at a receiving entity is transmitted. The sounding zone 235 is a field over which a sounding signal is transmitted, and the sounding signal is a signal transmitted for estimating a channel quality of an MS at a receiving entity, and is transmitted only when there is a request of a parent BS, or a request of a parent RS based on the request of the parent BS.

Fourth, the uplink frame #2 240 will be described.

The uplink frame #2 240 is a frame that an RS transmits to a parent BS. The uplink frame #2 240 at least includes a data symbol field 241 and a pilot symbol field 243. The data symbol field 241 is a field over which traffic data targeting a parent BS is transmitted. The pilot symbol field 243 is a field over which a pilot signal for channel estimation at a receiving entity is transmitted.

A description has been made of the frame structure for the multi-hop TDD mobile communication system proposed by an exemplary embodiment of the present invention.

As described above, the multi-hop TDD mobile communication system generally operates in a half-duplex mode. However, when the multi-hop TDD mobile communication system operates in the half-duplex mode, an RS cannot simultaneously perform a signal transmission operation and a signal reception operation. Therefore, a data rate of the multi-hop TDD mobile communication system is ½, so the system has a limitation in the data rate.

Therefore, an exemplary embodiment of the present invention provides a scheme for allowing an RS to simultaneously perform the signal transmission operation and the signal reception operation, making it possible for the multi-hop TDD mobile communication system to operate in the full duplex mode, thereby preventing the limitation in the data rate. That is, according to an exemplary embodiment of the present invention, the multi-hop TDD mobile communication system allows an RS to receive a downlink frame #1 210 from a parent BS and to transmit a downlink frame #2 220 to a child MS in the same downlink frame interval at the same time, and also allows the RS to receive an uplink frame #1 230 from the child MS and to transmit an uplink frame #2 240 to the parent BS in the same uplink frame interval at the same time.

Because the RS can simultaneously perform the signal transmission operation and the signal reception operation in the same downlink frame and the same uplink frame in this manner, the multi-hop TDD mobile communication system operates in the full duplex mode.

In order to prevent interference from occurring between a BS and an RS and interference from occurring between an RS and an MS in the full duplex mode, an exemplary embodiment of the present invention allows an RS to use multiple antennas. That is, an exemplary embodiment of the present invention allows the RS to use a MIMO scheme. Because the RS uses multiple antennas in this way, the multi-hop TDD mobile communication system can acquire a MIMO diversity gain. Therefore, an exemplary embodiment of the present invention divides multiple antennas included in an RS into an antenna set #1 used only for communication with a parent BS, and an antenna set #2 used only for communication with a child MS. The antenna set #1 may include at least one antenna, and the antenna set #2 also may include at least one antenna. For example, the antenna set #1 and the antenna set #2 are installed such that they are physically spaced from each other so as to prevent interference from occurring therebetween.

A description will now be made of an operation of transmitting/receiving the downlink frames and the uplink frames using the antenna sets in the multi-hop TDD mobile communication system.

An RS receives a downlink frame #1 210 transmitted by a parent BS with an antenna set #1 and transmits a downlink frame #2 220 to a child MS with an antenna set #2 in the same downlink frame interval at the same time. In addition, the RS receives an uplink frame #1 230 transmitted by the child MS with the antenna set #2 and transmits an uplink frame #2 240 to the parent BS with the antenna set #1 in the same uplink frame interval at the same time.

Performance of the multi-hop TDD mobile communication system depends on how the system will use the antenna set #2 among the antenna sets included in an RS. On the assumption that a channel between an RS and a parent BS is a Line-Of-Sight (LOS) channel, a channel quality between the RS and the parent BS is the best channel quality, i.e. the most robust and trusty channel quality.

However, the channel quality between the RS and the parent BS is variable, so the performance of the multi-hop TDD mobile communication system depends on how the system uses the antenna set #2. A detailed description will now be made as to how the RS selects antennas included in the antenna set #2 and transmits signals to the child MS using the selected antennas.

An arbitrary MS is connected to an RS through an initial access procedure. The RS, when the MS is connected thereto in this way, can adjust an antenna set that it will use for a signal transmission/reception operation with the MS, and a detailed description thereof will be made below.

When the connection between the RS and the MS is made through the initial access procedure, the RS sends a transmission request for a sounding signal to the MS. The MS transmits a sounding signal in response to the request from the RS, and upon receipt of the sounding signal transmitted by the MS, the RS estimates a downlink channel quality between the RS and the MS. The downlink channel quality between the RS and the MS, because the RS uses multiple antennas included in the antenna set #2, is a downlink channel quality for each of the multiple antennas.

After estimating the downlink channel quality for each of the multiple antennas, the RS performs a scheduling operation on the MS to determine the carriers that it will allocate to the MS. The scheduling operation is not directly related to an exemplary embodiment of the present invention, so a detailed description thereof will be omitted herein.

After completion of the scheduling on the MS, the RS selects an antenna via which it will transmit signals to the MS. A detailed description will now be made of an operation of selecting an antenna used for transmitting signals to the MS.

It will be assumed that the multi-hop TDD mobile communication system includes one BS, R RSs, and $M_r$ (where r=1, 2, ..., R) children MSs, and that each of the R RSs includes an antenna set #2 including $N_r$ antennas. An Average Channel Power Gain (ACPG) for the carriers allocated to an MS #$m_r$ (where $m_r$=1, 2, ..., $M_r$) will be referred to as $\gamma_{n_r,m_r}$, where $n_r$ (=1, 2, ..., $N_r$) denotes an antenna index. An active antenna set $A_{m_r}$ is determined in the RS #r according to the following active antenna set decision algorithm.

Active Antenna Set Decision Algorithm

---

Update $\gamma_{n_r,m_r}$, for $n_r$ = 1, 2, ..., $N_r$, and $m_r$ = 1, 2, ..., $M_r$;
for $m_r$ = 1 : $M_r$
$\quad A_{m_r} = \phi$;

$\quad n_r^{max} = \arg\max_{n_r} \gamma_{n_r,m_r}$;

$\quad A_{m_r} = A_{m_r} + n_r^{max}$;

$\quad$ while $\max_{n_r \notin A_{m_r}} \gamma_{n_r,m_r} \geq \gamma_{TH}$ and$|A_{m_r}| \leq$ MAX_SUPPORTED_TX $\quad\quad n_r^{max} = \arg\max_{n_r \notin A_{m_r}} \gamma_{n_r,m_r}$;

$\quad\quad A_{m_r} = A_{m_r} + n_r^{max}$
$\quad$ Next
Next

---

In the active antenna set decision algorithm, $\gamma_{TH}$ denotes a predetermined ACPG threshold, $|A_{m_r}|$ denotes the number of elements, i.e. antennas, included in the active antenna set $A_{m_r}$, and $|A_{m_r}|$ has a value which is equal to or less than the total number MAX_SUPPORTED_TX of antennas included in the antenna set #2 of the RS. In addition, $n_r^{max}$ denotes $n_r$ for maximizing $\gamma_{n_r,m_r}$. Although the active antenna set decision algorithm uses herein ACPG as a reference parameter for antenna selection, it can use any other parameter capable of indicating a channel quality for each individual antenna, instead of the ACPG. That is, the use of the active antenna set decision algorithm can maximize the transmission capacity of the MSs.

The RS, for transmission capacity increase of the MS, can transmit signals via the antennas included in the active antenna set using a space-time code, for example, Space Time Block Code (STBC). The signal transmission using the space-time code is not directly related to an exemplary embodiment of the present invention, so a detailed description thereof will be omitted herein.

Figure 3:
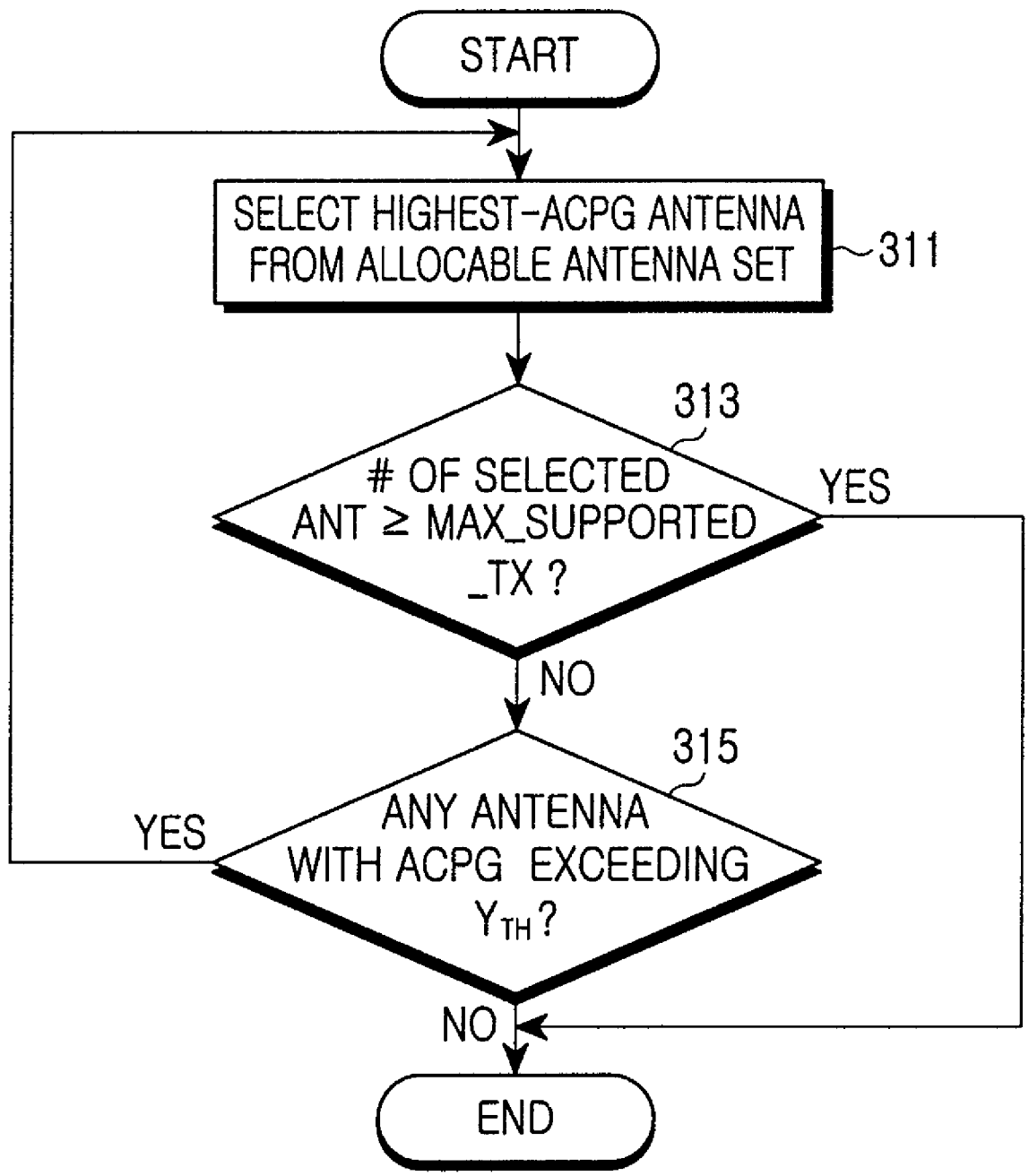
FIG. 3 is a flowchart illustrating a process in which an RS determines an antenna for a child MS using an active antenna set decision algorithm in a multi-hop TDD mobile communication system according to an exemplary embodiment of the present invention.

With reference to FIG. 3, a description will now be made of an exemplary method in which an RS determines an antenna for a child MS using an active antenna set decision algorithm in a multi-hop TDD mobile communication system according to an exemplary embodiment of the present invention.

Referring to FIG. 3, in step 311, an RS selects an antenna having the highest ACPG using ACPG information of a child MS for each of antennas included in an allocable antenna set (or active antenna set). The allocable antenna set can include herein antennas that can be currently allocated to the child MS, among the antennas included in the antenna set #2 of the RS. The RS can acquire ACPG information for each of the antennas included in the allocable antenna set depending on a sounding signal transmitted by the child MS, and a description thereof has been made above. An ACPG of the antenna selected by the RS can exceed the ACPG threshold $\gamma_{TH}$ or can be lower than or equal to the ACPG threshold $\gamma_{TH}$, and this has nothing to do with the antenna selection. The RS excludes the selected antenna from the allocable antenna set, and then proceeds to step 313.

In step 313, the RS determines whether the number of selected antennas is greater than or equal to the total number MAX_SUPPORTED_TX of antennas that the RS uses for signal transmission. If it is determined that the number of selected antennas is greater than or equal to MAX_SUPPORTED_TX, the RS ends the antenna decision process because there is no more antenna to be selected in the allocable antenna set.

In contrast, if it is determined in step 313 that the number of selected antennas is less than MAX_SUPPORTED_TX, the RS proceeds to step 315. The RS determines in step 315 whether there is any antenna whose ACPG exceeds an ACPG threshold $\gamma_{TH}$, among the antennas included in the allocable antenna set. If it is determined that there is no antenna whose ACPG exceeds the ACPG threshold $\gamma_{TH}$, among the antennas included in the allocable antenna set, the RS ends the antenna decision process because there is no more antenna to be selected in the allocable antenna set.

In contrast, if it is determined in step 315 that there is an antenna whose ACPG exceeds the ACPG threshold $\gamma_{TH}$, among the antennas included in the allocable antenna set, the RS returns to step 311. After selecting the antennas with which it will perform communication with the corresponding MS, the RS can use Modulation and Coding Scheme (MCS) to meet the ACPG of the selected antennas. By adaptively selecting the antennas in this manner, the RS can maximize the transmission capacity of the MSs.

As is apparent from the foregoing description, an exemplary embodiment of the present invention allows the multi-hop TDD mobile communication system to transmit/receive signals in the full duplex mode, thereby preventing the limitation in the data rate. In addition, an exemplary embodiment of the present invention allows the multi-hop TDD mobile communication system to select antennas that it will use for communication with an MS according to ACPG of the MS, and to transmit/receive signals using the selected antennas, thereby acquiring a MIMO diversity gain.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A system to transmit/receive a signal, the system comprising:
    a base station (BS);
    at least one mobile station (MS); and
    a relay station (RS) comprising:
    a first antenna set including at least one antenna, used for signal exchange with the BS; and
    a second antenna set including a plurality of currently allocable antennas, used for signal exchange with the MS, wherein the RS selects at least one antenna from the second antenna set for each of the at least one MS, and exchanges a signal with the MS using the selected at least one antenna, wherein the RS transmits a second downlink signal to the MS in a same time interval as a time interval for which it receives a first downlink signal transmitted to the RS by the BS, wherein when a number of antennas included in the second antenna set is greater than or equal to two (2), the RS selects at least one antenna to be used for signal exchange with the MS using a channel quality for each of the at least two antennas, wherein the channel quality comprises an average channel power gain (ACPG), and wherein the RS generates an allocable antenna set including antennas currently allocable to the MS in the second antenna set, selects an antenna having a highest ACPG among the antennas included in the generated allocable antenna set, excludes the selected antenna from the allocable antenna set, determines whether there is any antenna having ACPG exceeding a predetermined ACPG threshold in the allocable antenna set when a number of antennas selected is less than a number of antennas included in the second antenna set, and if there is an antenna having ACPG exceeding the ACPG threshold, selects an antenna having a highest ACPG among them.

2. The system of claim 1, wherein the RS adaptively selects at least one antenna from the second antenna set to maximize the communication capacity with the MS.

3. The system of claim 1, wherein the RS adaptively selects at least one antenna from the second antenna set using an estimated channel quality of each antenna included in the second antenna set to maximize the communication capacity with the MS.

4. The system of claim 3, wherein the RS estimates a channel quality of each antenna included in the second antenna set using a sounding signal received from the MS.

5. The system of claim 1, wherein the first antenna set and the second antenna set are spatially spaced from each other.

6. The system of claim 1, wherein the RS transmits a signal to the MS via the selected at least one antenna using a space-time code.

7. The system of claim 1, wherein the RS transmits a second uplink signal to the BS in a same time interval as a time interval for which it receives a first uplink signal transmitted to the RS by the MS.

8. The system of claim 7, wherein a frequency band over which the first uplink signal is received is identical or overlapping with a frequency band over which the second uplink signal is transmitted.

9. The system of claim 1, wherein a frequency band over which the first downlink signal is received is identical or overlapping with a frequency band over which the second downlink signal is transmitted.

10. A method to transmit/receive a signal in a relay station (RS) of a mobile communication system, the method comprising:

when the RS includes a first antenna set including at least one antenna, used for signal exchange with a base station (BS), and a second antenna set including a plurality of currently allocable antennas, used for signal exchange with a mobile station (MS), selecting at least one antenna for each MS from the second antenna set; and exchanging a signal with the said MS using the selected at least one antenna, wherein the exchanging of the signal comprises transmitting a second downlink signal to the MS in a same time interval as a time interval for which it receives a first downlink signal transmitted to the RS by the BS, wherein when a number of antennas included in the second antenna set is greater than or equal to two (2), at least one antenna to be used for signal exchange with the MS is selected using a channel quality for each of the at least two antennas included in the second antenna set, wherein the channel quality comprises an average channel power gain (ACPG), and wherein the exchanging of the signal comprises:

generating an allocable antenna set including antennas currently allocable to the MS in the second antenna set;

selecting an antenna having a highest ACPG among the antennas included in the generated allocable antenna set;

excluding the selected antenna from the allocable antenna set;

determining whether there is any antenna having ACPG exceeding a predetermined ACPG threshold in the allocable antenna set when a number of antennas selected up to now is less than a number of antennas included in the second antenna set;

when there is an antenna having ACPG exceeding the ACPG threshold, selecting an antenna having a highest ACPG among them; and exchanging a signal with the MS using the selected antenna.

11. The method of claim 10, wherein the selecting of at least one antenna comprises adaptively selecting at least one antenna from the second antenna set to maximize the communication capacity with the MS.

12. The method of claim 10, wherein the selecting of at least one antenna comprises adaptively selecting at least one antenna from the second antenna set using an estimated channel quality of each antenna included in the second antenna set to maximize the communication capacity with the MS.

13. The method of claim 12, wherein a channel quality of each antenna included in the second antenna set is estimated using a sounding signal received from the MS.

14. The method of claim 10, wherein the first antenna set and the second antenna set are spatially spaced from each other.

15. The method of claim 10, wherein the exchanging of the signal comprises transmitting a signal to the MS via the selected antenna using a space-time code.

16. The method of claim 10, wherein a frequency band over which the first downlink signal is received is identical or overlapping with a frequency band over which the second downlink signal is transmitted.

17. The method of claim 10, wherein the exchanging of the signal further comprises transmitting a second uplink signal to the BS in a same time interval as a time interval for which it receives a first uplink signal transmitted to the RS by the MS.

18. The method of claim 17, wherein a frequency band over which the first uplink signal is received is identical or overlapping with a frequency band over which the second uplink signal is transmitted.

19. A relay station (RS) in a mobile communication system including a base station (BS) and at least one mobile station (MS), the RS comprising:

a first antenna set including at least one antenna, used for signal exchange with a base station (BS); and a second antenna set including a plurality of currently allocable antennas, used for signal exchange with a mobile station (MS), wherein the RS selects at least one antenna from the second antenna set for each of the at least one MS, and exchanges a signal with the MS using the selected at least one antenna, wherein the RS transmits a second downlink signal to the MS in a same time interval as a time interval for which it receives a first downlink signal transmitted to the RS by the BS, wherein when a number of antennas included in the second antenna set is greater than or equal to two (2), the RS selects at least one antenna to be used for signal exchange with the MS using a channel quality for each of the at least two antennas, wherein the channel quality comprises an average channel power gain (ACPG), and wherein the RS generates an allocable antenna set including antennas currently allocable to the MS in the second antenna set, selects an antenna having a highest ACPG among the antennas included in the generated allocable antenna set, excludes the selected antenna from the allocable antenna set, determines whether there is any antenna having ACPG exceeding a predetermined ACPG threshold in the allocable antenna set when a number of antennas selected is less than a number of antennas included in the second antenna set, and if there is an antenna having ACPG exceeding the ACPG threshold, selects an antenna having a highest ACPG among them.

20. The RS of claim 19, wherein the RS transmits a second uplink signal to the BS in a same time interval as a time interval for which it receives a first uplink signal transmitted to the RS by the MS.

* * * * *